Patented Apr. 5, 1927.

1,623,301

UNITED STATES PATENT OFFICE.

RALPH F. BRENNER, OF ROCHESTER, PENNSYLVANIA, ASSIGNOR TO H. C. FRY GLASS COMPANY, OF ROCHESTER, PENNSYLVANIA, A CORPORATION OF PENNSYLVANIA.

HEAT-RESISTING GLASS.

No Drawing. Application filed May 9, 1922. Serial No. 559,609.

My invention relates to the production of a stable, translucent, heat resisting glass of the boro-silicate type suitable for use in oven ware, laboratory vessels, or other utensils or articles which in use must be capable of withstanding high temperatures or relatively rapid changes in temperature without fracture.

Glass of this character has usually contained silica 65% to 85% (by weight), boric oxide 10% to 20%, alkali oxides such as sodium and potassium 5% to 10%, and also small amounts of aluminum, calcium and magnesium oxides.

Heretofore the efforts to produce a satisfactory glass for oven ware or other utensils or articles subject to high temperature have proceeded on the theory that the requisite thermal endurance must be obtained by reducing the coefficient of expansion to a minimum. Fracture of glass subjected to rapid heating or cooling occurs because of the inequality in change of temperature as between one part of the body and the other, for example, as between the surface of the body and the interior portions thereof, this unequal change in temperature setting up internal strains that the body may be incapable of withstanding. By reducing the expansivity of the glass, that is, by minimizing the difference in expansion between the highly heated and the less heated portions of the glass body the liability to fracture is, obviously diminished.

I have discovered, however, that a stable glass (stability referring to relative non-solubility in water) of the boro-silicate type can be obtained by increasing the toughness of the glass (non-brittleness) as well as by decreasing its coefficient of expansion and, in fact, that it is possible, by the novel method to be hereinafter described, to produce a very serviceable oven glass, for example, in which the coefficient of expansion is, relatively speaking, high, by a composition of the batch and manipulation of the melt which will increase the toughness of the glass sufficiently to compensate for the higher expansivity. I have discovered further that the increased toughness is to be obtained by producing in the melting operation a colloidal suspension of certain ingredients and arresting the heating operation before the suspended particles are fully dissolved, as will occur in most cases, at least, if the application of heat is continued for a considerable period of time. It is the colloidal condition of certain of the ingredients of the glass that gives the glass its increased toughness. This colloidal condition manifests itself in the finished glass as a lack of transparency. The glass of my invention is relatively opaque, that is to say, translucent, while the heat resisting boro-silicate glasses, as heretofore made, have been transparent or nearly so. Moreover, the glass in accordance with my invention has this advantage over other heat resisting glasses, that it can be more conveniently and cheaply produced; the batch is melted at a lower temperature; the control of the manufacture simplified and facilitated because less care and accuracy in the melting operation is required; the glass produced is softer and more easily worked.

My invention, therefore, has for its objects, first, the production of a stable, heat resisting, boro-silicate glass of novel character and properties; and, second, a new and improved method of producing such glass.

In carrying out my invention a batch is made up comprising, preferably, sand, boric acid, cryolite, and substances containing aluminum, sodium and potassium, and also magnesium and calcium. To the batch are preferably added, also, substances containing lithium, rubidium and cæsium. While it is not essential to use all of the ingredients named there is an advantage in having the batch as complex as indicated. The tendency to crystallize is minimized and apparently the maintenance of the colloidal suspension of certain of the ingredients is facilitated. The ingredients of the batch are preferably proportioned so that the glass contains: silica 65% to 80%, boric oxide 10% to 20%, alumina 2% to 10%, alkali oxides (of sodium, potassium, lithium, rubidium and cæsium) 5% to 10%, and oxides of the second group of the periodic system (magnesium and calcium) 0.5% to 2%.

As a specific example the following is a suitable batch:

| | Pounds |
|---|---|
| Sand | 750 |
| Boric acid | 262 |
| Cryolite | 98 |
| Nitre | 45 |
| Feldspar | 10 |
| Fluorspar | 3 |
| Talc | 28 |
| Lepidolite | 20 |
| Hydrate of aluminum | 6 |

Glass made from this batch will have a chemical composition substantially as follows:

| | Per cent. |
|---|---|
| Silica | 74.38 |
| Boric oxide | 14.70 |
| Sodium oxide | 5.96 |
| Aluminum oxide | 3.45 |
| Calcium oxide | .22 |
| Magnesium oxide | .72 |
| Potassium oxide | .45 |
| Lithium, rubidium and caesium oxides | .12 |

The batch is heated to a suitable melting temperature, for example, 2600° to 2800° Fahrenheit. The melt will be turbid, due to the colloidal condition of the alumina and possibly some of the other ingredients. The silica, boric oxide and alkali oxides probably form a true solution. The cryolite ($Na_3AlF_6$) breaks up forming, with oxygen, sodium oxide and aluminum oxide, the fluorine being volatilized in a great measure at least. The sodium oxide goes into solution but the aluminum oxide will remain in a suspended or colloidal state for a time. Probably an aluminum fluoride is formed which breaks down eventually but leaves the alumina in such condition that it does not immediately dissolve. I understand that cryolite has been used as a flux in the manufacture of boro-silicate glasses but so far as I am aware it has not been employed for producing a colloidal condition in the melt by preventing the complete solution of the alumina.

As soon as the ingredients have been melted, and while the material is still turbid, preferably before planing has ceased, the application of heat to the batch is discontinued so as to preserve in the glass the colloidal condition produced in the melt. The glass will be translucent in appearance and will be considerably tougher than the ordinary heat resisting glass of the boro-silicate type. Subjected to a deflection test, the fracture of the glass does not occur until some time after the glass begins to yield under a constant load. When ordinary glass is subject to a deflection test and the result plotted the breaking points occurs in the curve, almost immediately after the yield point, that is, the point at which the glass begins to yield without additional load, the yield up to this point having been substantially proportional to the increase in load. With the glass of my invention a considerable distance intervenes on the curve between the yield point and the breaking point. This indicates lack of brittleness, that is to say, toughness.

Other physical characteristics by actual tests of the glass are as follows:

Coefficient of expansion (linear) .0000043 millimeters per centigrade degree, between 20° centrigrade and 300° centigrade.

Tensile strength 9 kilograms per square millimeter.

Young's modulus of elasticity by deflection 6200 kilograms per square millimeter.

Density 2.29.

Stability .0015 grams per hundred square centimeters.

Thermal endurance calculated by Winkelmann & Schott's equation (Hovestadt, Jena Glass, MacMillan 1902, p. 229), 7.5.

It may be said that the turbid or colloidal condition of the glass whereby the increased toughness is obtained, is dependent upon three factors: (1) the character of the batch, it being essential that the batch contain an ingredient which will remain for a time in colloidal suspension, that is to say, not completely dissolved; (2) a melting temperature which is not too high, too high a temperature bringing about the dissolving of the suspended material; and (3) the duration of the heating period, it being necessary to stop the application of heat before the melt becomes clear, that is, before all the ingredients are completely dissolved. There is an interrelation between these three factors. It is necessary, practically, to use ingredients which will melt easily and at a relatively low temperature and which, when melted, will produce a turbid condition that will last for an appreciable time. If the turbidity disappears quickly, that is, if the ingredients all go into solution very soon after melting, it may be possible to preserve in the glass the colloidal condition of the melt but the necessity of calculating the temperatures and the length of the melting period, so that the melt will not become clear, would, under such circumstances, be so great as to make the operation impractical. With the manufacture of the glass carried on as above described, the melt will remain turbid long enough so that the proper character of glass can be obtained without inconvenience or excessive watchfulness.

I claim:

1. A heat resisting glass containing silica, boric oxide, an alkali oxide and aluminum oxide, the latter being in colloidal condition.

2. A heat resisting glass containing silica 65% to 80%, by weight, boric oxide 10% to 20%, alkali oxides 5% to 10% and aluminum oxide 2% to 10%, the latter being in a colloidal condition.

3. Method of manufacturing a heat resisting glass of the boro-silicate type, which consists in producing in the melt a colloidal suspension of certain ingredients of the glass, and arresting the heating operation so as to preserve said colloidal condition in the product.

4. Method of manufacturing a heat resisting glass of the boro-silicate type, which consists in melting a batch containing silica, a boron compound, an alkali metal alumina, and a flourine compound to produce a colloidal solution, and arresting the heating operation so as to preserve the colloidal condition in the product.

5. Method of manufacturing a heat resisting glass of the boro-silicate type, which consists in melting a batch containing silica, a boron compound, an alkali metal alumina and a flourine compound, and arresting the heating operation while the melt is still turbid to produce a translucent glass.

6. Method of manufacturing a heat resisting glass of the boro-silicate type, which consists in melting a batch containing silica, boric acid, an alkali metal, alumina and cryolite, and stopping the application of heat while the melt is still turbid to produce a translucent glass.

7. Method of manufacturing a heat resisting glass of the boro-silicate type, which consists in melting a batch containing silica, a boron compound, an alkali metal, alumina, an oxide of the second group of the periodic system, and a flourine compound to produce a colloidal solution, and arresting the heating operation so as to preserve the colloidal condition in the product.

8. Method of manufacturing a heat resisting glass of the boro-silicate type, which consists in melting a batch containing silica, a boron compound, an alkali metal, alumina, an oxide of the second group of the periodic system, and a flourine compound, and arresting the heating operation while the melt is still turbid to produce a translucent glass.

9. Method of manufacturing a heat resisting glass of the boro-silicate type, which consists in melting a batch containing silica, boric acid, an alkali metal, an oxide of the second group of the periodic system, alumina and cryolite, and stopping the operation of heat while the melt is still turbid to produce a translucent glass.

RALPH F. BRENNER.